United States Patent
Wagner et al.

(10) Patent No.: US 7,095,858 B2
(45) Date of Patent: Aug. 22, 2006

(54) SYSTEM AND METHOD FOR SECURELY UPGRADING FIRMWARE

(75) Inventors: Phillip Ryan Wagner, Baltimore, OH (US); John Gilman Chapman, Jr., Delaware, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 1000 days.

(21) Appl. No.: 09/983,637

(22) Filed: Oct. 25, 2001

(65) Prior Publication Data

US 2003/0191955 A1 Oct. 9, 2003

Related U.S. Application Data

(60) Provisional application No. 60/289,825, filed on May 10, 2001.

(51) Int. Cl.
*H04K 1/02* (2006.01)

(52) U.S. Cl. .................. 380/281; 380/282; 380/283; 380/285; 380/44

(58) Field of Classification Search .......... 380/281, 380/282, 283, 285, 44
See application file for complete search history.

(56) References Cited

U.S. PATENT DOCUMENTS 6,049,612 A  4/2000  Fielder et al. ............. 380/44

FOREIGN PATENT DOCUMENTS

EP   0801478 A2   10/1997
WO   WO 99/08411   2/1999

OTHER PUBLICATIONS

European Search Report dated Aug. 1, 2002.

*Primary Examiner*—Thomas R. Peeso
(74) *Attorney, Agent, or Firm*—Reinhart Boerner Van Deuren P.C.

(57) ABSTRACT

Upgraded firmware for a microcontroller is created and encrypted to construct a file (116) that can be distributed and installed by technicians in the field. The encryption includes character encryption (210) of the data as well as a second level of block encryption (216). Within the encrypted file (116), information about the firmware and the target microcontroller (104) is included. The distributed firmware file (116) is stored on a portable device, such as a PDA, that can communicate with the target microcontroller (104) to effect a firmware transfer from the PDA (112) to the microcontroller (104). The microcontroller (104) includes a programming routine that receives the encrypted data stream from the PDA and decrypts the data before storing the new firmware image. The programming routine also identifies when updating the firmware has left the firmware in an unusable condition and prevents operation of the microcontroller until the firmware is restored. Accordingly, the security of the firmware is maintained throughout the distribution and upgrade process and the integrity of the upgrade process is maintained as well.

27 Claims, 6 Drawing Sheets

SYSTEM AND METHOD FOR SECURELY UPGRADING FIRMWARE

RELATED APPLICATIONS

This application relates to and claims priority from U.S. application Ser. No. 60/289,825 filed May 10, 2001 entitled FIRMWARE FIELD UPGRADE SECURITY METHOD, the disclosure of which is hereby incorporated in its entirety by reference.

TECHNICAL FIELD

The present invention relates to microcontrollers and, more particularly, to programming such microcontrollers.

BACKGROUND ART

Microcontrollers and microprocessors are used to control a variety of equipment and systems. In particular, large appliances such as heaters, air conditioners, thermostats, and refrigerators include programmable microcontrollers that manage and direct their operation. Such microcontrollers typically include, among other features, programmable memory that is programmed during assembly of the appliance to store information about the appliance as well as executable code that permits the microcontroller to perform its intended function.

By storing this appliance-controlling executable code in programmable memory, an appliance's performance and operation can be updated by merely reprogramming the microcontroller's programmable memory region. Such reprogramming can be performed in the field and eliminates the need for technicians to stock and install sensitive electronic devices for a large number of different appliances.

Along with such flexibility, however, comes some dangers. In particular, the easier it becomes to reprogram the microcontroller, the easier it becomes to install the wrong operating application in an appliance. Also the accessibility of the executable code for re-programming reprogrammable devices, can be targets for malicious or unscrupulous appliance owners or vandals. There is also the danger that proprietary information and appliance characteristics within the microcontroller's memory and executable code can be determined and misappropriated by business competitors.

While encryption of information is one option for addressing these concerns, this option typically requires more powerful, and costly, microprocessors than would otherwise be needed to simply control an appliance.

Accordingly, there exists an unmet need for a method and system by which firmware in a product (e.g., appliance) with a microcontroller can be upgraded while maintaining the privacy, security and integrity of the firmware throughout the upgrade process.

DISCLOSURE OF INVENTION

The present invention relates to a system and method for distributing firmware for a microcontroller's programmable (e.g., flash) memory that secures the privacy and security of the firmware during the upgrade process. In addition, the authenticity and integrity of the firmware is validated during the process and encryption and decryption algorithms are utilized that can be performed even by microcontrollers with 8/16 bit cores having limited mathematic processing capabilities.

One aspect of the present invention relates to a method and computer software for constructing an encrypted file. According to this aspect of the invention, first and second encryption keys are obtained and used to contract a third encryption key by combining and rearranging the first and second keys. A fourth encryption key is then constructed by selecting a subset of the third encryption key. A source file is first encrypted using the fourth encryption key to generate an intermediate file and the intermediate file is then encrypted using the third encryption key, Another aspect of the present invention relates to a method and computer software for constructing a firmware file for a target microcontroller. According to this aspect of the invention, an unencrypted firmware image file destined for a target microcontroller is obtained. Each byte of the image file is encrypted using a first key, wherein the first key's value partially depends on the device in which the target microcontroller is embedded. The byte-encrypted file is then block encrypted using a second key, wherein the first key is a selected portion of the second key.

A further aspect of the present invention relates to a method and computer software for updating firmware in a microcontroller. According to this aspect of the present invention, a microcontroller receives a request to update its current firmware and, in response, resets so as to initiate its boot-up sequence of instructions. First, the present integrity of the firmware is checked to determine whether or not to proceed with updating the firmware. If the firmware's integrity is verified, then the boot-up sequence waits for a time period to see if a command is received to begin the updating process. If no such command is received before the time period expires, then the microcontroller continues by executing the current firmware in normal operational mode. If, however, such a command is received, then the microcontroller continues by executing a firmware programming routine. When the firmware's integrity cannot be positively verified, the boot-up sequence continuously waits for the command to begin the updating process and does not enter normal operational mode.

Yet another aspect of the present invention relates to a method and software for upgrading firmware in a microcontroller-controlled device. According to this aspect of the invention, the microcontroller receives an encrypted portion of new firmware and verifies that the new firmware is appropriate for installation based on information in this first portion. The encrypted new firmware is then received along with a first CRC or other integrity value. In response, the new firmware is decrypted on the fly, used to calculate a second CRC (or integrity indicator), and then discarded. The received CRC and the calculated CRC are compared to determine the validity and integrity of the new firmware file before the current firmware is ever modified. Next, the encrypted new firmware is received again. This time, the stream of the encrypted firmware is decrypted using a first algorithm into blocks of intermediate data which, themselves, are decrypted using a second algorithm into an unencrypted firmware image that is written over the current firmware.

An additional aspect of the present invention relates to a firmware distribution file that is embodied on a carrier wave. According to this aspect of the innovation, the firmware distribution file includes: a firmware image that is encrypted using a first algorithm to create a first file; a header that contains information about the microcontroller, the firmware image or both; a combination of (a) the first file, (b) the header, and (c) a integrity indicator calculated from (a) and (b), the combination being encrypted using a second algorithm to create a second file; and an integrity indicator calculated from the second file.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION AND INDUSTRIAL APPLICABILITY

To aid with the understanding of the present invention, exemplary embodiments are presented within the context of a specific environments. It will be apparent, however, to one skilled in the art that the present invention may be practiced without these specific details. In other instances, well-known structures, devices, and processes are shown in block diagram form, herein, in order to avoid unnecessarily obscuring the present invention.

EXEMPLARY ENVIRONMENT

Figure 1:
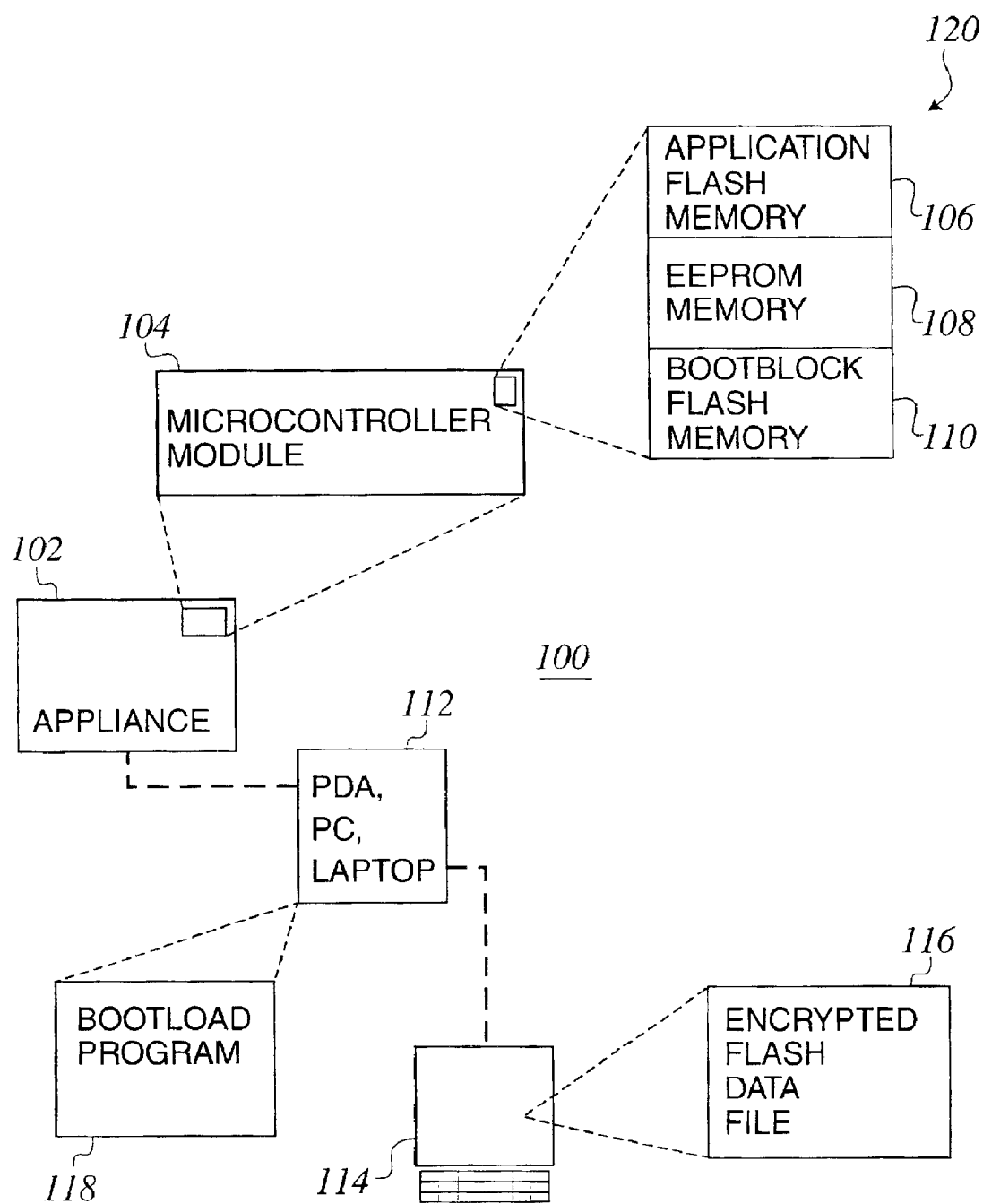
FIG. 1 illustrates an exemplary environment for application of embodiments of the present invention.

FIG. 1 illustrates one typical environment 100 that can benefit from various embodiments of the present invention. Within the illustrated environment 100, a computer 114 is used to design, test, debug and compile the main operating firmware for an appliance 102. The appliance 102 can be, for example, a heater, a heat pump, air conditioner, or other large appliance under control of a microcontroller. The operating firmware for the appliance 102 is executed by the microcontroller to control the operation of the appliance 102. For example, if appliance 102 is a heater, the microcontroller may have software routines to obtain information about a room's ambient temperature, information about a desired set point temperature, and information about the current operating state of the heater. Using such information, the operating firmware has other software routines that turn the heater on and off, initiate diagnostic cycles, or possibly communicate with other devices and appliances.

According to an embodiment of the present invention, the operating firmware is arranged into an encrypted flash data file 116 that can be used by the microcontroller once decrypted. Preferably, the computer 114 includes software routines that can arrange the operating firmware into a file that is formatted such that the file can be used by the microcontroller without further rearrangement, address linking, or other manipulation.

To get the encrypted file 116 to the appliance 102, a number of different distribution methods can be used. For example, an appliance manufacturer can have a web site from which technicians or other service personnel can download updated and upgraded firmware (for free or for a fee). Alternatively, or conjunctively, the various firmwares could be sent in periodic updates on a number of physical computer media or through e-mail. Regardless of the distribution method, a technician will obtain the file 116, store the file 116 on a portable computing device 112 (e.g., a PDA, laptop, etc.), and will arrive at the appliance 102 to perform a firmware upgrade or update.

The exemplary environment described herein includes a portable computing device 112 carried by a technician and, thus, is locally located with the appliance 102 during the upgrading of the appliance's operating firmware. The physical connection between the device 112 and the appliance 102 can include industry standard communication methods (e.g., RS-232, RS-422), infrared and other wireless communication schemes, or proprietary communications protocols that depend on the specific microcontroller 104 or appliance 102. While it is within the scope of the present invention that the portable computing device 112 can be a non-portable device located remotely from the appliance 102, such an environment is not described herein in detail, so as not to obscure the merits of the present invention, as such an alternative environment differs from the exemplary environment merely by utilizing remote communication capabilities such as network connectivity or modem capabilities rather than local communication methods.

The computing device 112 includes a bootload program for communicating with the appliance 102. This bootload program 118 can be freely distributed to service personnel as it does not contain decrypted keys or any decryption algorithm. Instead, the bootload program executes simple communication steps that initiate and carryout a file transfer operation with the appliance 102.

The appliance 102, as described earlier, includes a microcontroller 104 that controls its functioning and operation. Such a microcontroller 104, as is known in the art, usually has an 8 or 16-bit core that has limited mathematic capability. Even though more complex microcontrollers could be used, their added complexity adds to the cost of design, implementation and support while their additional performance capabilities go mostly unused.

In particular, the microcontroller 104 typically includes a number of memory regions for storing data and information about the appliance 102. A skilled artisan would recognize that many functionally equivalent arrangements and circuitry can be used to store the appliance's operational data and application software. The memory arrangement illustrated in FIG. 1 is one exemplary arrangement that includes a programmable memory region 106 for the microcontroller application software, an EEPROM memory 108 for less volatile data, and a programmable bootblock memory 110 that stores bootloading information and other data, such as encryption keys, that can be protected using hardware fuse bits and other security measures.

In operation, one embodiment of the present invention uses the bootload program 118 of the portable computing device 112 to signal to the appliance's microcontroller 104 that a firmware upgrade is to be initiated. In response, the microcontroller 104 executes a software routine that communicates with the portable device 112 to start receiving information from the device 112 and overwriting the application memory 106 with information from the new firmware upgrade file 116. Upon completing the download of the information from the firmware file 116, the microcontroller 104 is reset so that it can operate under the control of the newly acquired firmware now stored in the programmable memory 106.

Encryption Keys

Embodiments of the present invention utilize encryption to protect a firmware file 116 while it is being distributed. Without the file 116 being encrypted, information regarding the operation and capabilities of the appliance 102 can be readily determined from even a cursory examination of the instructions and data included in the file 116. Accordingly, as described in more detail below, the file 116 is encrypted by the computer 114 before being distributed and remains encrypted until being written to the programmable memory 106.

The encryption methods and protocols used by the different embodiments described herein utilize a number of keys to encrypt and decrypt information. In the exemplary environments, methods and embodiments described herein, these keys are described as having a particular length (e.g. 32 bits). Other key lengths are also contemplated within the scope of the present invention where shorter and longer keys can be used depending on whether more security or faster performance is desired. These keys, for example, can include:

Key A: A key selected at the time the file 116 is being created on the computer 114. This key is embedded in the file 116 and distributed with the file 116. By randomly, or continuously cycling, this key's selection, the encryption scheme can be further strengthened. A 32-bit KeyA has the structure A1H:A1L:A2H:A2L wherein each of the AxH and AxL refer to a byte and H refers to a higher order byte and L refers to the lower order byte.

Key B: A key, the same size as KeyA, that is embedded in the bootblock region 110 during initial programming of the microcontroller 104 and protected using conventional hardware security measures such as fuse bits. All appliances 102 of a particular product family have the same KeyB but this key differs among different product families. A 32-bit KeyB has the structure B1H:B1L:B2H:B2L.

KeyAB: A key derived from KeyA and KeyB by permuting the different bytes. The exemplary method described herein utilizes the particular 64-bit permutation of: A1H:B1L:B2H:A2L:B1H:A1L:A2H:B2L. Other arrangements of the bytes of KeyA and KeyB are contemplated, as well.

SubKeyAB: An 8-bit key derived by taking, for example, every fifth bit of each byte segment in KeyAB. As most characters are represented using an 8-bit code, an 8-bit code is useful for implementing a character encryption routine.

If additional security is warranted, 128-bit key encryption keys can be used. For example, KeyA would be a 64-bit key, KeyB would be a 64-bit key and KeyAB would be a 128-bit key. The same permutation scheme would still apply for KeyAB but each particular byte (e.g., B1L, A2H, etc.) would have a length of 16 bit rather than 8 bits.

Flash File Construction

Figure 2:
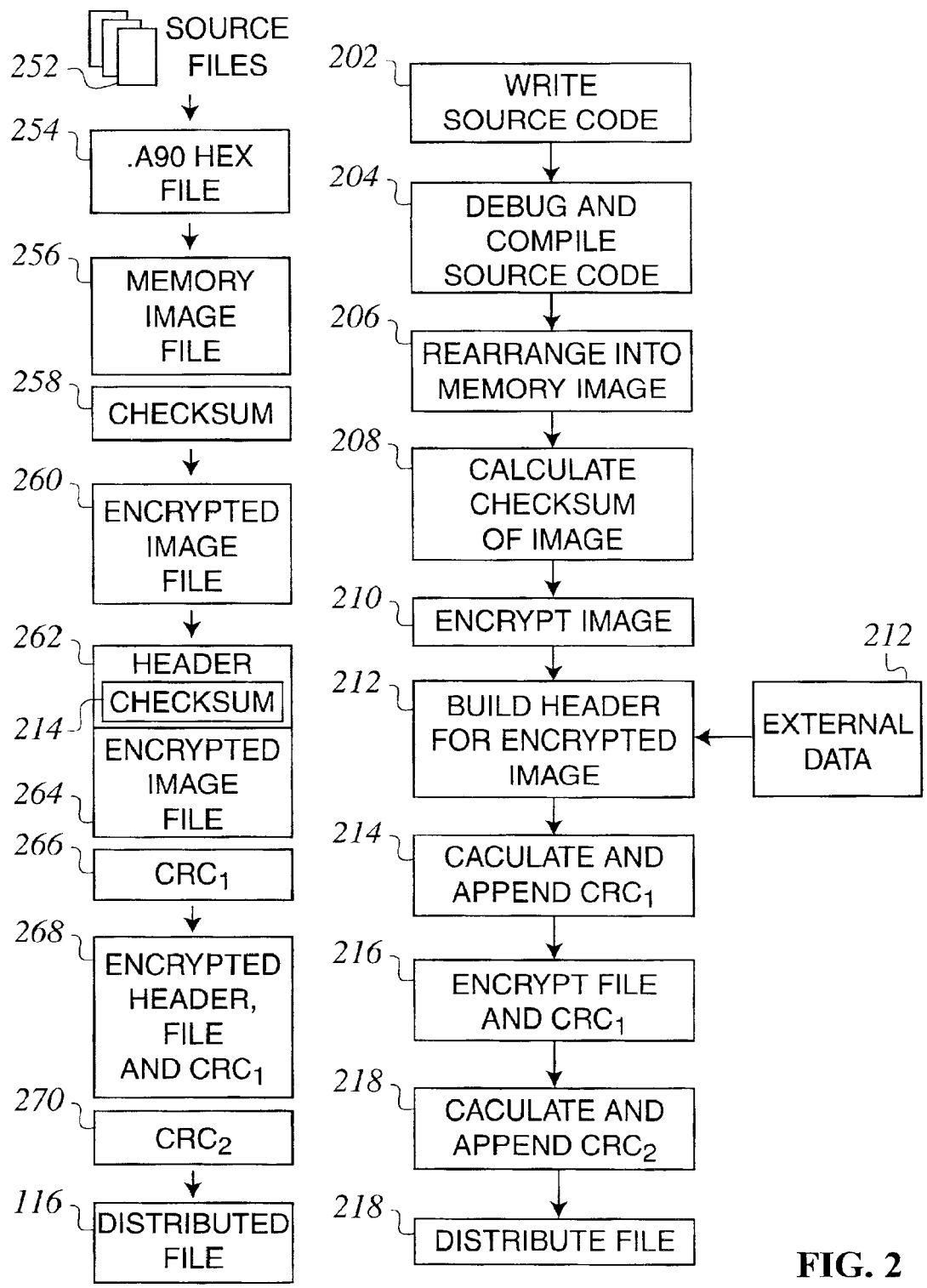
FIG. 2 illustrates a flowchart for constructing an encrypted firmware file according to embodiments of the present invention and also illustrates the transitional file structures corresponding to the different flowchart steps.

FIG. 2 illustrates a flowchart for constructing an encrypted flash file 116 in accordance with an embodiment of the present invention for updating the firmware in an appliance 102. Also included in FIG. 2, to the left of the flowchart steps, is an illustration of the individual modifications to the distribution file 116 as it is constructed. In creating the firmware for the appliance 102, a programmer typically uses a higher-level computer language, for example C, to write (step 202) the source code 252 for the control and operational routines that make up the firmware. Conventional development suites and programming environments operating on the computer 114 provide tools that will compile, debug and edit (step 204) the source code 252 for a target microcontroller 104. The resulting compiled file 254 will typically be in a recognized industry format, such as an .A90 hex file.

In step 206, this standard format file 254 is rearranged to construct a memory image file 256 that can execute without modification on the microcontroller 104 and its memory arrangement 120. For example, an .A90 hex file 254 can be stripped of its native header information and column checksums. Furthermore, the data addresses in the .A90 hex file 254 can be stripped and rearranged to conform to the memory section 120 of the target microcontroller 104 by stuffing empty bytes with $00 to fill the entire memory image. Alternatively, instead of using conventional development tools, proprietary tools can be developed which internally integrate the rearrangement steps 206 described above.

In order to later verify the integrity of the image file 256, a checksum 258 can be calculated (step 208) and stored for later use.

To protect the information that can be explicitly and implicitly discovered from the image file 256, the image file 256 is initially encrypted (step 210) using a character encryption method. In a preferred embodiment, this encryption method substitutes for each character (e.g., 8 bits) in the file 256 with the following algorithm:

$$CYPHER=((SOURCE'+SubKeyAB+LASTCYPHER) \bmod 256)\ XOR\ (LASTCYPHER)$$

In the above equation, CYPHER is the substituted character, SOURCE is the complement of the original character, and LASTCYPHER is the most recent, previously-substituted character. As can be appreciated, this algorithm implements cipher chaining which utilizes an initial value or vector which, in a preferred embodiment, is SubKeyAB or a derivative thereof.

The particular substitution equation identified above is exemplary only and a skilled artisan would recognize that other variations are contemplated. For example, SOURCE does not have to complemented and the modulo dividend of 256 can be changed to suit the character bit length.

In order to implement this encryption routine, the software development environment executing on the computer 114 has at its availability KeyA and KeyB to allow the construction of SubKeyAB from KeyAB. In particular, KeyA can be calculated by the computer 114 using random number generators or obtained from other conventional cryptographic tools used to generate keys. KeyB is obtained from a highly confidential local or remote database that stores the encryption keys corresponding to particular product families. This is the same key that is embedded in an appliance's bootblock 110 when that appliance 102 is manufactured or initially programmed.

A header 262 is then constructed (step 212) using information 240 relating to the intended appliance 102 for the image file 256. The information 240 can include microcontroller and equipment hardware version, software version, checksum 258, software expiration date, product (or appliance) ID, and KeyA. Other information about the software or the target equipment can also be included in this header 262. The inclusion of this information will permit the programming routine of the microcontroller 104 to verify that the image file 256 is the appropriate file for the particular appliance 102 and microcontroller 104 on which it is trying to be installed. Information about products, appliances and software versions can be stored in the computer 114 or automatically determined by evaluating a software developer's responses and choices to menus and prompts during the creation of the image file 256. In a preferred embodiment, KeyA is the first information in the header 262. With KeyA being located in this position, a later decryption routine can extract KeyA after only receiving the first portion of the header 262.

In step 214, a cyclic redundancy check (CRC) is calculated for the header 262 and the encrypted image file 264. This CRC will permit verification of the integrity of the encrypted file and header during a later decrypting step.

If the source file (262, 264 and 266) were distributed as is, the image file 256 would be protected by only one level of encryption and KeyA would be transmitted in the clear, thus limiting the protection of the image file 256. Accordingly, a second encryption routine (step 216) is used to further protect the firmware file that is ultimately distributed.

The length of the header 262 can be adjusted so that the source file (262, 264, and 266) that is encrypted in step 216 has a length in bytes that is evenly divisible by a predetermined integer. For example, if the source file (262, 264, and 266) has a length in bytes evenly divisible by 8 then a 64-bit (i.e., 8 bytes) block cipher can be used to encrypt the source file in step 216.

In a preferred embodiment, each 64 bit segment of the source file (262, 264, and 266) is encrypted (step 216) using byte permutation and the 64-bit key KeyAB. The permutation order is the same for each 64-bit segment and reorders the 8 bytes (B1:B2:B3:B4:B5:B6:B7:B8) to (B2:B8:B1:B7:B3:B6:B4:B5).

The block encryption routine of step 216 substitutes each 64-bit segment with the following algorithm:

$$CYPHER=(SOURCE)XOR(KeyAB)+LASTCYPHER$$

where SOURCE is an 8-byte block after it has been permuted.

A CRC 270 is calculated (step 218) for the encrypted file 268 and appended thereto in order to construct the distribution file 116 that is distributed (step 220) for installation by a technician.

Field Operation

Because of the two-level encryption scheme, the firmware upgrade distribution file 116 and KeyA can be distributed via any of a variety of physical and electronic means without fear of revealing protected or sensitive information. Once distributed to technicians or service companies, the firmware upgrade can be loaded or stored in portable diagnostic equipment, PDAs, laptop computers or remotely networked computers 112. From whatever equipment 112 the firmware upgrade file 116 is loaded on, the file can then be uploaded to the microcontroller 104 to be stored in the programmable memory area 106.

Because the file 116 that is stored on the portable device 112, for example a PDA, is encrypted and the image file stored in memory 106 and executed by the microcontroller 104 is unencrypted, the present inventive firmware upgrade methods include routines for decrypting the data that is uploaded from the PDA 112 to the application memory area 106.

If the decryption scheme is constructed such that it occurs at the PDA 112, then any technician with an appropriately programmed PDA would be able to view the image file 256 as cleartext. If the decryption keys and methods were stored in a region of memory 120 that could be read from, then decryption of the distribution file 116 could be accomplished after extracting the necessary information from the memory 120. Accordingly, embodiments of the present invention include a firmware upgrade method that performs, at the microcontroller 104, decryption of a received encrypted data stream using stored executable code and data that are protected by hardware security fuse bits to prevent access to predetermined memory regions from external readers while still allowing access to those same memory regions from executing instructions.

As previously explained, the microcontroller 104 executes main application software which determines and controls the functioning and operation of the appliance 102. This main application, or firmware, typically executes as a continuous loop that is interrupted, intentionally or unintentionally, by external occurrences such as a power reset or an external interrupt signal.

Upon reset, the microcontroller 104 begins execution by jumping to an address known as the reset vector which points to a section of instructions known as a bootblock. Once the sequence of instructions in the bootblock are completed, the control of the microprocessor 104 jumps to the starting location of the main application, or firmware, and begins execution.

In embodiments of the present invention, the bootblock 110 includes instructions to wait for a 'Program' code (or command) and also other instructions that implement a firmware updating or programming routine.

Upgrading Firmware

Figure 3:
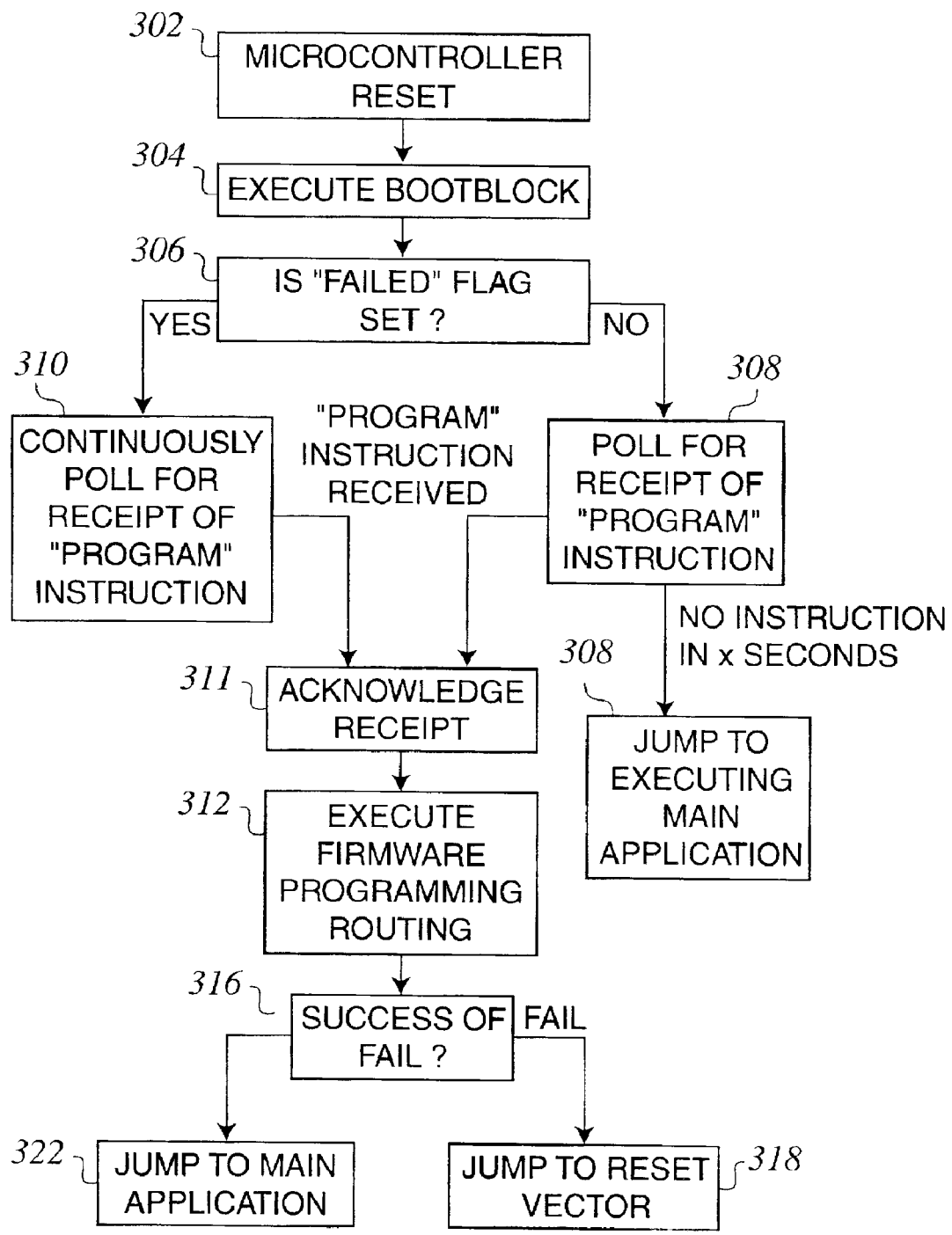
FIG. 3 illustrates a flowchart of a bootblock routine for update firmware in accordance with an embodiment of the present invention.

FIG. 3 illustrates a flowchart of upgrading or updating of microcontroller firmware in accordance with an embodiment of the present invention.

In step 302, the microcontroller 104 is reset. This reset can be due to a power interruption, actuation of a reset switch, or a software interrupt, or condition, that results in a self-initiated reset. Upon resetting, the microcontroller 104 enters and begins execution of the bootblock 110, in step 304. The bootblock 110 checks, in step 306, if a 'FAILED' flag is set indicating some error in the programming of the firmware. If this flag is not set, then flow continues with step 308. If, however, this flag is set, then the microcontroller 104 is prevented from controlling the appliance 102 and, instead, continuously waits, in step 310, for receipt of a 'Program' command.

In step 308, the microcontroller also waits for receipt of a 'Program' command from an external source, such as device 112. However, in step 308, the wait only lasts for a predetermined length (e.g. 5 seconds). If no 'Program' command is received during this time period, then the microcontroller 104 continues its execution by jumping to the main application software in step 314 and normal operation of the appliance commences.

A microcontroller, as is known in the art, typically includes a number of input ports for receiving and recognizing data in a variety of formats and protocols. The microcontroller 104 polls (in steps 308 and 310) one or more of these input ports for the 'Program' command sent by the device 112 being used by a technician.

Regardless of whether the polling occurs during step 308 or step 310, the receipt of the 'Program' code results in the sending of an acknowledgment to the portable device 112 in step 311 and the execution of a programming routine in step 312 that receives new firmware from the device 112 and overwrites the existing firmware with this new firmware.

The firmware programming routine of step 312 returns a "success" indicator that is used in step 316 to determine whether the bootblock flow continues with step 320 or step 318. If the programming routine was unsuccessful, then, in step 318, the microcontroller retrieves the RESET vector and jumps there so that the firmware programming can be repeated. If the programming routine was successful, then the 'FAILED' flag is cleared in step 320 and program flow continues, in step 322, by jumping to the beginning of the new firmware to begin execution.

Using the Portable Device

Figure 4:
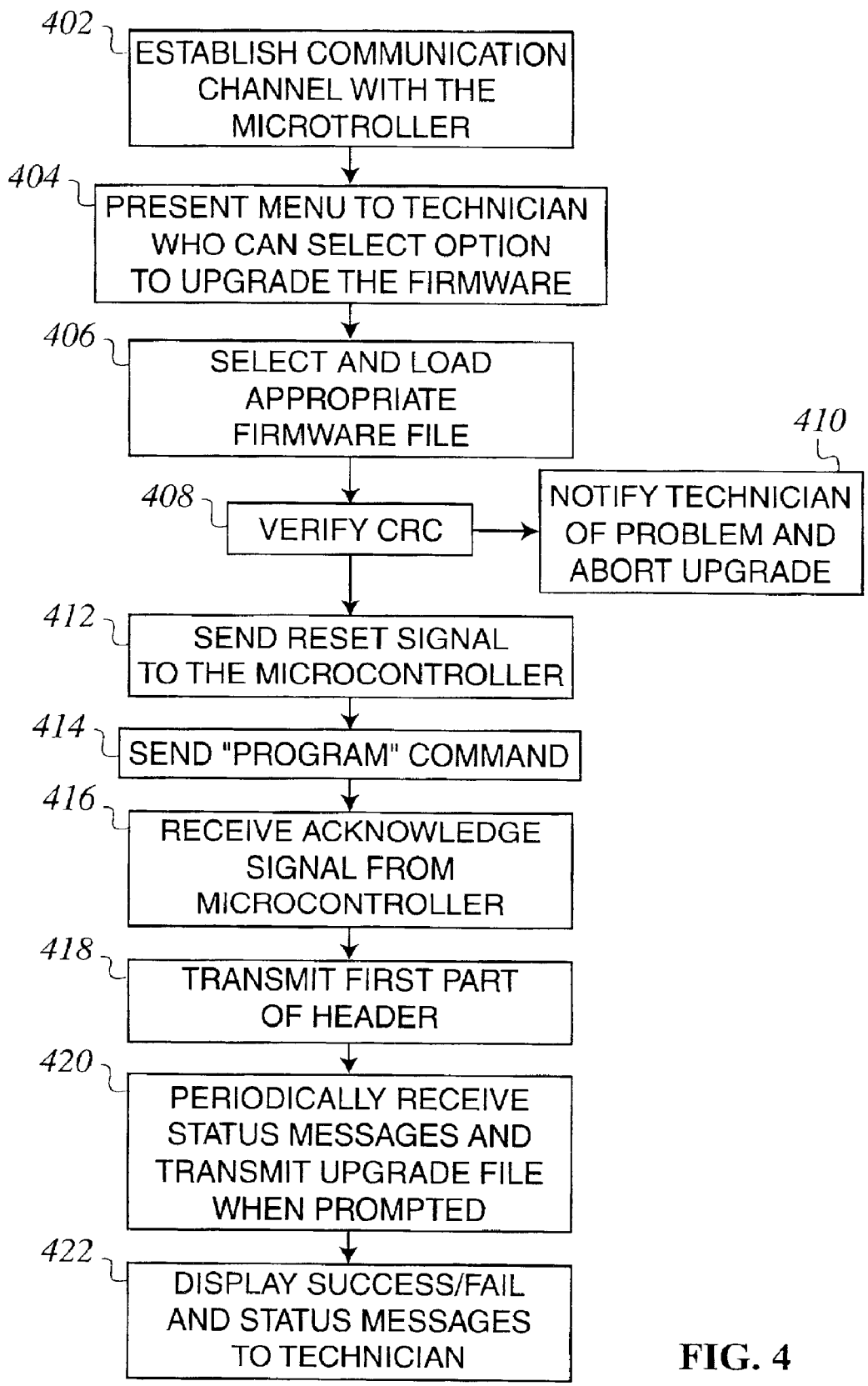
FIG. 4 illustrates a flowchart for communicating with a microcontroller to upload an encrypted firmware file in accordance with an embodiment of the present invention.
Figure 5:
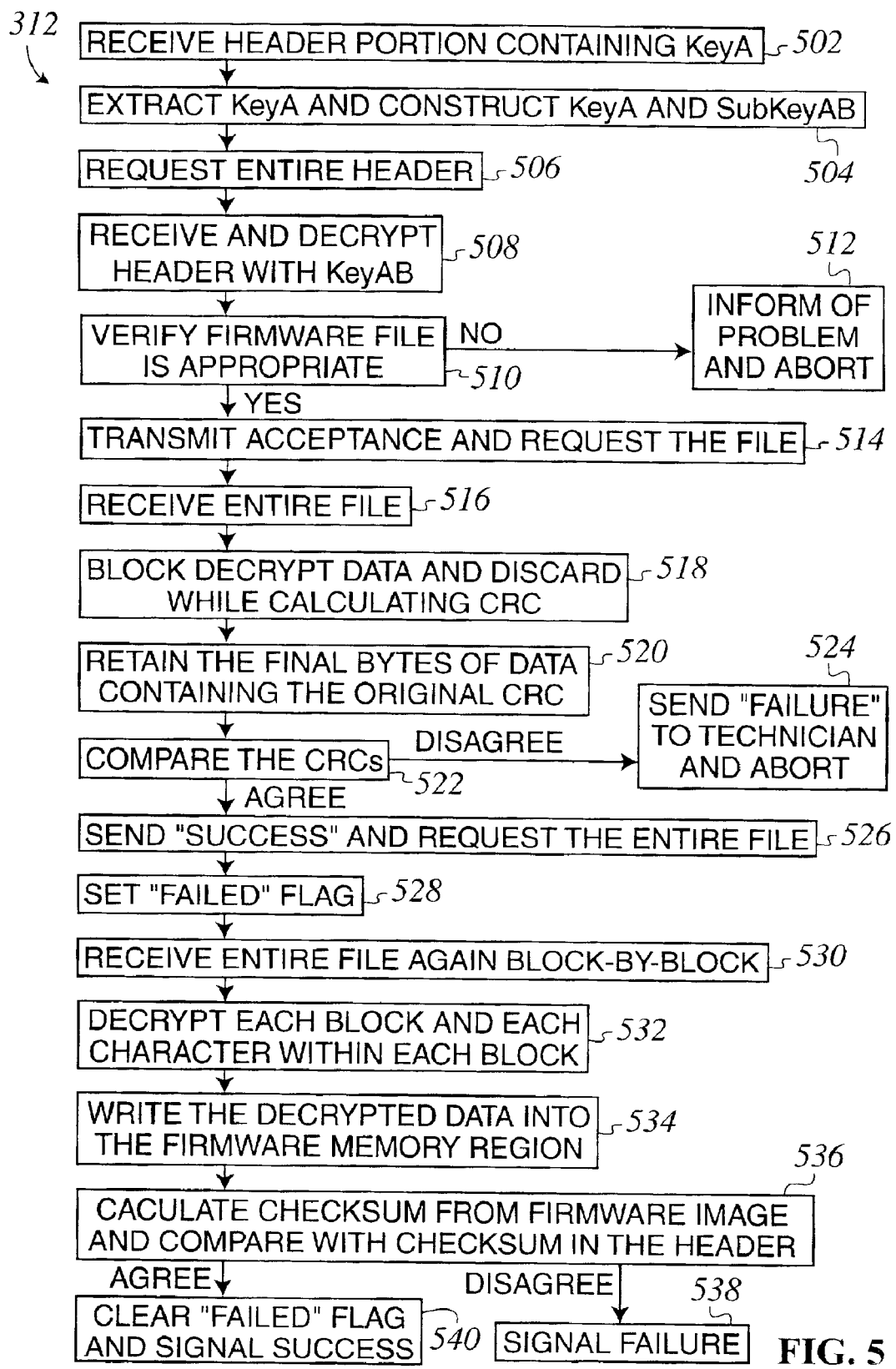
FIG. 5 illustrates a flowchart which details decrypting a received firmware file in accordance with an embodiment of the present invention.

The details of the firmware programming routine of step 312 are illustrated by the flowchart of FIG. 5. This routine is executed during the bootloading process of the microcontroller 104 and involves communication with the device 112. While the present invention focuses on the upgrading of firmware of a microcontroller, a software application is necessarily described below, with reference to FIG. 4, that operates on the device 112. The functional behavior of this application executing on device 112 is designed to interoperate with the inventive firmware upgrading methods executed by the microcontroller 104. Other software applications that could execute on the device 112 which may differ in design details but that provide equivalent, or similar, function are contemplated within the scope of the present invention.

In step 402, a technician using the portable device 112 establishes a communication channel with the microcontroller 104 of the appliance 102. In designing the communication software routines, some prior knowledge of the various microcontrollers, their command sequences, and their capabilities is needed.

Next, in step 404, the software application presents to the technician a menu, or similar list, of available firmware upgrade files that are stored on the device 112. In response to the technician's selection of a particular firmware file, that file is retrieved, in step 406, in preparation for uploading to the microcontroller 104.

The firmware upgrade file has associated with it a CRC that was distributed along with the firmware file. In retrieving the file in step 406, the software also calculates a CRC of the file and compares, in step 408, the calculated CRC with the original CRC for agreement. Other data verification methods, such as checksums, can be used instead of a CRC.

If the two CRCs are different, then the software notifies the technician using visible, audible, or other means, in step 410, and ends the firmware upgrade process. If, however, the two CRCs are in agreement, then the firmware upgrade process can continue with step 412, by sending a reset signal to the microcontroller 104. After, the reset signal is sent, the software sends, in step 414, the 'Program' command or code to the microcontroller at regular intervals until an acknowledgment is received from the microcontroller, in step 416, indicating that the 'Program' command was received and recognized. Step 414 can include a timer that signals the technician that a predetermined time period has passed since the sending of the reset signal without receipt of an acknowledgment from the microcontroller 104. Using this information, the technician can determine if a problem may exist with the established communications channel, the microcontroller 104, or the portable device 112.

Once an acknowledgment is received from the microcontroller 104, the software continues, in step 418, by transmitting the first part of the encrypted header of the firmware upgrade file. The size of the transmitted portion is the same as the key size used to block encrypt the firmware file. This portion of the header includes a permuted and encrypted version of KeyA which the microcontroller uses in conjunction with KeyB to decrypt the firmware file.

The microcontroller 104 receives the transmitted header portion and then begins receiving and decrypting the firmware upgrade file as described below with reference to FIG. 5. In performing the firmware upgrade, the microcontroller 104 periodically requests data to be sent from the device 112 and also transmits various status messages and other information. In response to the communication stream from the microcontroller 104, the software, as in step 420, receives and processes these messages and requests, streams the encrypted firmware upgrade file to the microcontroller 104, and displays an indication of the status of the upgrade process for the benefit of the technician. Upon completion of the upgrade process, the microcontroller 104 transmits an indication of whether the process was successful or not. This indication of the process's success is displayed, in step 422, to the technician.

Firmware Programming Details

FIG. 5 illustrates an embodiment of the firmware programming or updating routine introduced as step 312 in FIG. 3. This routine is executed by the microcontroller 104 to communicate with the portable device 112 so that the encrypted firmware upgrade file is received, decrypted and written to the firmware memory region 106.

To reach step 502, the portable device 112 has already sent a reset request to the microcontroller 104 and issued the 'Program' command which has been received and acknowledged.

In response to receiving the acknowledgment from the microcontroller 104, the portable device 112 transmits the first portion of the block encrypted header to the microcontroller 104. In step 502, this portion of the header is received by the programming routine. In step 504, KeyA is extracted from the received portion and KeyB is obtained from a known location in the bootblock memory region 110. Using the two keys, the routine constructs KeyAB and SubKeyAB.

Once the decryption keys are constructed the microcontroller 104 signals, in step 506, the portable device 112 to send the entire header which is received in step 508 and decrypted using KeyAB.

The information within the header can be used to ensure that the firmware upgrade is appropriate for the microcontroller 104. For example, the decrypted software version can be compared to the software version stored in the EEPROM memory region 108 to see if a later (or an earlier) version is being installed. A similar comparison can be used to compare compatible Hardware Types and IDs from the header with the information in the EEPROM memory 108. Other tests can involve the firmware expiration date, the appliance identification number and any other information stored in the header. The programming routine 312 can also include sending the extracted information back to the portable device 112 in order to query the technician whether the upgrade should proceed based on the extracted information. After receiving the technician's approval, for example as in step 514, the microcontroller 104 continues with the upgrade process by requesting the receipt of the entire encrypted file.

The file is received, in step 516 and the data is decrypted, in step 518, but is discarded as it is received while a CRC is calculated for the received file on the fly. Accordingly, at no time is an entire decrypted image of the file available on the device 112 or the appliance 102 for misappropriation.

In step 520, the last portion of the encrypted file containing the original, encrypted CRC that was distributed with the file is extracted and retained. The extracted CRC is compared with the CRC calculated in step 518 to determine the validity and integrity of the firmware file.

If the two CRCs do not agree then a failure message is sent to the portable device 112 in step 524 and the upgrade process is aborted. If, however, the two CRCs do agree, then a success message is sent to the portable device 112 in step 526 and the upgrade process continues with the portable device 112 resending the entire encrypted file. In addition, the 'FAILED' flag is set (See step 306 of FIG. 3) to indicate that the firmware may be in an unusable condition in step 528. Upon successful completion of the firmware programming, this flag is cleared. However, if the programming routine fails or is interrupted, then this flag remains set and the microcontroller reenters the programming mode upon being reset instead of trying to execute faulty firmware.

In step 530, the programming routine receives the entire encrypted file and, in step 532, decrypts by block and by character the firmware file. The decrypted characters from the firmware image file are written, in step 534, to the firmware memory region 106 on the fly. However, as some flash memories require writing of data in page sizes, the decrypted characters may be collected in properly sized segments before being written to the memory 106. Within the header, the checksum for the image file is included and is extracted for later use.

Once the new firmware image file has been written in the memory region 106, a checksum is calculated in step 536. This calculated checksum is compared with the checksum extracted from the header to determine if the firmware programming was successful. If the checksums disagree, then the 'FAILED' flag remains set and the portable device 112 is informed of the failure in step 538. Under such conditions (as described in FIG. 3), the microcontroller 104 stays in the programming mode and waits for the portable device 112 to try again to update the firmware. If, however, the checksums agree, then the 'FAILED' flag is cleared and the device 112 is informed of the success. Under these latter circumstances, the microcontroller 104 begins operating under control of the new firmware.

Details of Extracting Keys

During construction of the encrypted file 116, KeyA was permuted across twice its size and encrypted with KeyAB. Thus, the beginning portion of the header in encrypted file 116 that is twice the size of KeyA contains KeyA encoded within.

Figure 6:
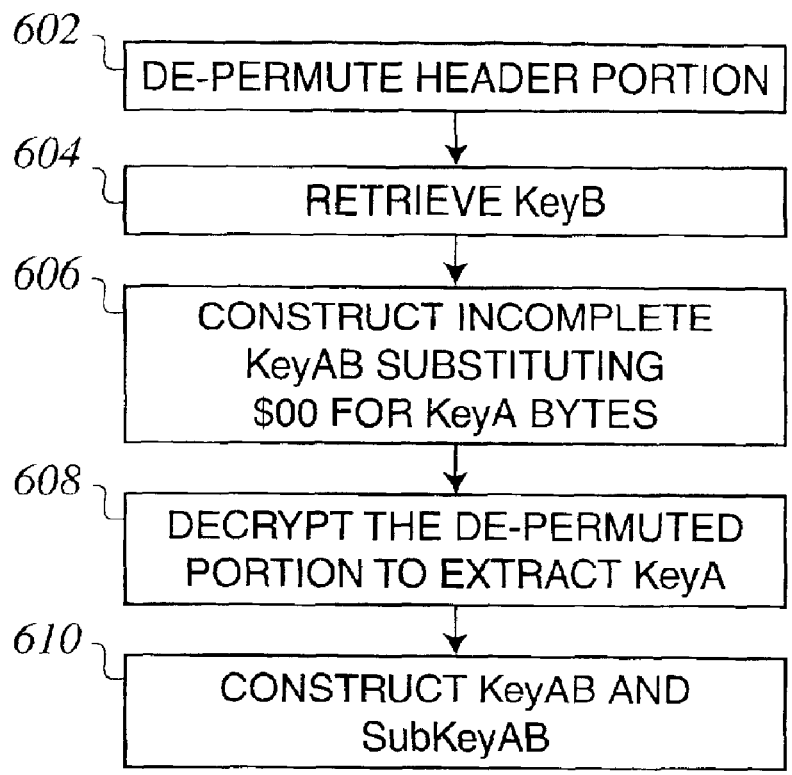
FIG. 6 illustrates a detailed flowchart of extracting and constructing decryption keys in accordance with an embodiment of the present invention.

This portion of the header is received from the device 112 and decrypted to the point of being able to extract KeyA as described earlier in step 504. A flowchart which details the extraction of KeyA from the received encrypted header portion is depicted in FIG. 6. This flowchart continues with the exemplary embodiment previously introduced in which KeyA and KeyB are 32-bit keys used to derive a 64-bit key KeyAB and an 8-bit key SubKeyAB.

In step 602, the received header portion is de-permuted by reordering bytes (B1:B2:B3:B4:B5:B6:B7:B8) to (B3:B1:B5:B7:B8:B6:B4:B2), and KeyB which is stored in bootblock 110 is retrieved, in step 604, in order to begin decryption of the firmware file.

In step 606, KeyAB is constructed from KeyA and KeyB by reordering the bytes from the keys as described earlier. However, at this stage of decryption, KeyA is not yet known and, therefore, $00 is substituted in KeyAB for all the bytes from KeyA. This incomplete version of KeyAB is then used to block decrypt the de-permuted bytes by the following algorithm:

SOURCE=(CYPHER)XOR(KeyAB)+LASTCYPHER

In the above substitution, SOURCE is the cleartext version of the header portion received from the device 112.

The first 32 bits of the resulting cleartext reveals KeyA which can be extracted for later use. It is because of the specific rearrangement of both the bytes that make up KeyAB and the rearrangement of the bytes that are block encrypted and decrypted as well as the nature of the XOR operation that allow the incomplete version of KeyAB to decode the encrypted bytes corresponding to KeyA and, thereby, permits its extraction. The specific, exemplary embodiment described herein is but one way of accomplishing the encryption and decryption of KeyA in this manner. Other permutations and rearrangements of bytes which result in KeyA being extractable by an incomplete KeyAB are also contemplated within the scope of the present invention.

The availability of KeyB and the discovery of KeyA permit the construction of a complete KeyAB and also SubKeyAB, in step 610, for later use. These latter keys are constructed as described earlier.

Details of Decrypting Firmware

Figure 7:
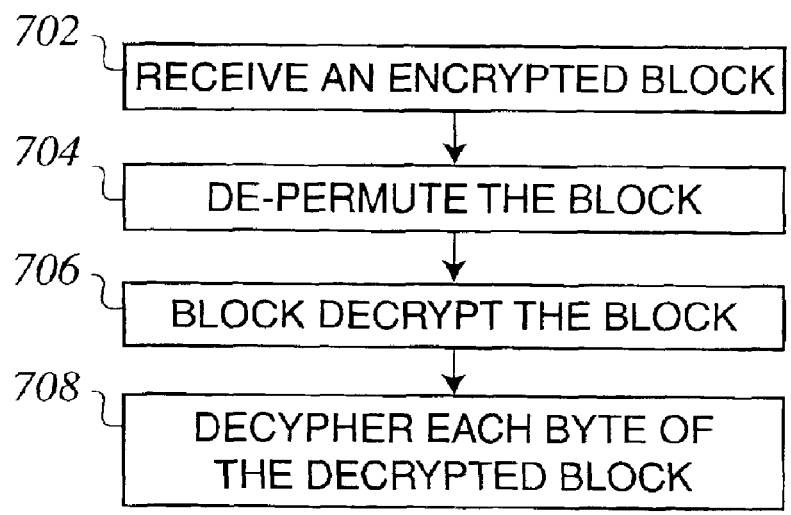
FIG. 7 illustrates a detailed flowchart of block decrypting and byte decrypting a firmware file in accordance with an embodiment of the present invention.

With the decryption keys available, the firmware programming routine is able to receive, for example, a 64-bit segment and block decode it and then byte decode each byte within the block (see step 534 of FIG. 5). FIG. 7 illustrates a flowchart which details the decryption, or decoding, of the firmware file 116.

In step 702, an encrypted block is received. The block size varies according to the size of KeyAB which in the exemplary embodiment is 64 bits in size. The received block is de-permuted, in step 704, by reordering bytes (B1:B2:B3:B4:B5:B6:B7:B8) to (B3:B1:B5:B7:B8:B6:B4:B2). The de-permuted bytes are then block decrypted, in step 706, according to the substitution algorithm:

SOURCE=(CYPHER)XOR(KeyAB)+LASTCYPHER

Each decrypted block includes a plurality of character encrypted bytes. Thus, in step 708, each encrypted byte is decrypted according to the algorithm:

DECIPHERED=(((CIPHERED)XOR(SubKeyAB))'+SubKeyAB+LASTCYPHER)MOD 256

In the above equation, DECIPHERED is the cleartext version of each CIPHERED byte of the firmware image that was encoded and encrypted in the distribution file 116. These deciphered bytes are written to the firmware memory region 106 to update the firmware for the controller 104.

The particular decryption scheme described above provides significant security but is limited to simple integer manipulations that can be easily and quickly performed by less-powerful microcontrollers having only basic mathematic function.

A firmware programming method has been described which can be reinitiated following a programming failure (i.e., re-entrant), prevents future microcontroller execution of the firmware should programming be interrupted or corrupted, validates the authenticity and the integrity of the distributed firmware before the existing firmware is altered, prompts a technician when the firmware appears to be a downgrade, verifies that firmware for different product types cannot be programmed into the wrong product, verifies that the new firmware is compatible with the target hardware, microcontroller and product, mathematically friendly to microcontrollers, and secures the privacy of the firmware since all decryption occurs within.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method for constructing an encrypted file comprising the steps of:

obtaining a first key and a second key having a same size;

obtaining a third key that is constructed by rearranging and combining the first and second keys, wherein the third key is larger in size than the first and second keys;

obtaining a fourth key that is constructed by selecting a subset of the third key, wherein the fourth key is smaller in size than the first, second and third keys;

encrypting (210) a source file (256) by encrypting a plurality of segments of the source file (256) using the fourth key to generate a first encrypted file (260), the size of each segment being equal in size to the fourth key; and encrypting (216) the first encrypted file (260) by encrypting a plurality of blocks of the first encrypted file (260) using the third key to generate a second encrypted file (268), the size of each block being equal in size to the third key.

2. The method according to claim 1, further including the step of:

appending (212) the first key to the first encrypted file (260) before generating the second encrypted file (268).

3. The method according to claim 1, further including the steps of:

calculating (208) a checksum of the source file; and appending the checksum (258) to the first encrypted file (260) before generating the second encrypted file (268).

4. The method according to claim 1, further including the steps of:

calculating (214) a cyclic redundancy check (266) for the first encrypted file (260); and appending the cyclic redundancy check (266) to the first encrypted file (260) before generating the second encrypted file (268).

5. The method according to claim 1, further including the steps of:

calculating a cyclic redundancy check (270) of the second encryption file (278); and appending the cyclic redundancy check (270) to the second encryption file (278).

6. A method for constructing a firmware file for a target microcontroller, comprising the steps of:

obtaining a firmware image file (256) for the target microcontroller (104);

encrypting (210) each byte of the firmware image file (256) using a first key to generate a first encrypted file (260), wherein the value of the first key depends on a device (102) using the target microcontroller (104); and encrypting (216) each block of the first encrypted file (260) using a second key to generate a second encrypted file (268), wherein the first key is a subset of the second key.

7. The method according to claim 6, further comprising the steps of:

obtaining a private key that is based on the target microcontroller (104);

obtaining a public key that is associated with the firmware image file (256);

obtaining the second key that is constructed by rearranging and combining the private and public keys, wherein the second key is larger in size than the public and private keys; and obtaining the first key that is constructed by selecting a subset of the second key, wherein the first key is smaller in size than the second, public and private keys.

8. The method according to claim 6, further comprising the step of:

appending (212) the public key to the first encrypted file (260) before generating the second encrypted file (268).

9. The method according to claim 6, further including the steps of:

calculating a checksum (258) of the firmware image file (256) and appending the checksum (258) to the first encrypted file (260) before generating the second encrypted file (268);

calculating a first cyclic redundancy check (266) on the first encrypted file (260) and appending the first cyclic redundancy check (266) to the first encrypted file (260) before generating the second encrypted file (268); and calculating a second cyclic redundancy check (270) on the second encrypted file (268) and appending the second cyclic redundancy (270) check to the second encrypted file (268).

10. The method according to claim 6, further comprising the step of:

appending to the first encrypted file (260) information (240) about at least one of a software version of the firmware image file (256), compatible hardware for the firmware image file (256), and an expiration period of the firmware image file (256).

11. A method for updating firmware in a microcontroller, the method comprising the steps of:

receiving a request (414) to update a current firmware;

in response to the request, initiating (304) a boot-up sequence of instructions;

determining (306) the current firmware's integrity;

if the integrity is verified, then waiting (308) a predetermined period of time for an initiation signal to begin a firmware upgrade process and executing (314) the current firmware if the initiation signal is not received during the predetermined period of time;

if the integrity is not verified, then waiting (310) for the initiation signal; and in response to the initiation signal, executing (312) a firmware programming routine that receives new firmware and overwrites the current firmware with the new firmware.

12. The method according to claim 11, further comprising the steps of:
setting an flag (528) to indicate that the firmware may be in a corrupted state when the firmware programming routine is executed; and
clearing the flag (540) if the firmware programming routine indicates that overwriting the current firmware is successful.

13. The method according to claim 11, further comprising the steps of:
receiving an indication (316) of how successful the firmware programming routine is at overwriting the current firmware;
executing the new firmware (322), if the indication is one of success; and
initiating (318) the boot-up sequence of instructions, if the indication is not one of success.

14. A method for upgrading firmware in a microcontroller-controlled device, the method comprising the steps of:
receiving (506) an encrypted first portion of a new firmware;
verifying (510) that the new firmware is appropriate for a microcontroller, based on the first portion;
receiving the new firmware (516) in encrypted form and a previously calculated first integrity indicator for the new firmware;
generating (518) a decrypted data stream by decrypting the received new firmware based on a first decryption algorithm;
calculating (518) a second integrity indicator of the decrypted data stream and discarding the decrypted data stream;
validating (522) the new firmware's integrity based on the first and second integrity indicators;
if the new firmware's integrity is successfully validated, receiving (530) the new firmware in encrypted form;
decrypting (532) the received new firmware based on the first decryption algorithm to generate a plurality of bytes;
decrypting (532) each of the plurality of bytes based on a second decryption algorithm to generate a firmware image file; and
overwriting (534) a current firmware with the generated firmware image file.

15. The method according to claim 14, further comprising the steps of:
retrieving (604) from a local memory store a first decryption key whose value depends on the device;
using the first decryption key to extract (608) a second decryption key from the encrypted first portion;
constructing (610) a third encryption key by combining and rearranging the first and second encryption keys; and
wherein the first encryption algorithm relies on the third decryption key and the second encryption algorithm relies on a subset of the third encryption key.

16. A computer readable media bearing instructions for constructing an encrypted file, said instructions being arranged to cause one or more processors upon execution thereof to perform the steps of:
obtaining a first key and a second key having a same size;
obtaining a third key that is constructed by rearranging and combining the first and second keys, wherein the third key is larger in size than the first and second keys;
obtaining a fourth key that is constructed by selecting a subset of the third key, wherein the fourth key is smaller in size than the first, second and third keys;
encrypting the source file by encrypting a plurality of segments of a source file using the fourth key to generate a first encrypted file, the size of each segment being equal in size to the fourth key; and
encrypting the first encrypted file by encrypting a plurality of blocks of the first encrypted file using the third key to generate a second encrypted file, the size of each block being equal in size to the third key.

17. A computer readable media bearing instructions for updating firmware in a microcontroller, said instructions being arranged to cause one or more processors upon execution thereof to perform the steps of:
receiving a request to update a current firmware;
in response to the request, initiating a boot-up sequence of instructions;
determining the current firmware's integrity;
if the integrity is verified, then waiting a predetermined period of time for an initiation signal to begin a firmware upgrade process and executing the current firmware if the initiation signal is not received during the predetermined period of time;
if the integrity is not verified, then waiting for the initiation signal; and
in response to the initiation signal, executing a firmware programming routine that receives new firmware and overwrites the current firmware with the new firmware.

18. A computer readable media bearing instructions for upgrading firmware in a microcontroller-controlled device, said instructions being arranged to cause one or more processors upon execution thereof to perform the steps of:
receiving an encrypted first portion of a new firmware;
verifying that the new firmware is appropriate for a microcontroller, based on the first portion;
receiving the new firmware in encrypted form and a previously calculated first integrity indicator for the new firmware;
generating a decrypted data stream by decrypting the received new firmware based on a first decryption algorithm;
calculating a second integrity indicator of the decrypted data stream and discarding the decrypted data stream;
validating the new firmware's integrity based on the first and second integrity indicators;
if the new firmware's integrity is successfully validated, receiving the new firmware in encrypted form;
decrypting the received new firmware based on the first decryption algorithm to generate a plurality of bytes;
decrypting each of the plurality of bytes based on a second decryption algorithm to generate a firmware image file; and
overwriting a current firmware with the generated firmware image file.

19. A computer readable encrypted firmware distribution file (116) embodied in a carrier wave, comprising:
a first file (260) encrypted according to a first algorithm, said first file comprising a firmware image (256) for a target microcontroller (104);
a header (262) comprising information about one or both of the target microcontroller (104) and the firmware image (256);

a second file (268) encrypted according to a second algorithm; said second file (268) comprising the first file (260), the header (262) and a first integrity indicator (266) calculated from the first file (260) and the header (262); and a second integrity indicator (270) calculated from the second file (268).

20. The carrier wave according to claim 19, wherein the header further comprises an encryption key used in the first and second algorithms.

21. A method for securely updating microcontroller firmware, the method comprising the steps of:

receiving (308) a request from a remote device (112) to upgrade firmware of a microcontroller (104);

receiving (530) an encrypted file from the remote device (112), the encrypted file comprising an executable application for operating an appliance (102) controlled by the microcontroller (104);

decrypting (532) the received file to construct an unencrypted firmware image based on the executable application; and storing (534) the unencrypted firmware image in a programmable memory (120) accessible by the microcontroller (104).

22. The method according to claim 21, further comprising the step of:

retrieving (604) a first decryption key from a protected memory location accessible by the microcontroller (104), wherein the protected memory location is located local to the microcontroller (104).

23. The method according to claim 22, further comprising the step of:

retrieving (504) a second decryption key from a portion of the encrypted file.

24. The method according to claim 23, further comprising the step of:

performing (534) the decrypting step using the first and second decryption keys.

25. The method according to claim 21, further comprising the step of:

verifying (510) the encrypted file is appropriate for the microcontroller after receiving the encrypted file but before constructing the unencrypted firmware image.

26. The method according to claim 21, further comprising the step of:

verifying (522) the integrity of the encrypted file before constructing the unencrypted firmware image.

27. The method according to claim 21, wherein the remote device (112) is a handheld device locally connected to the microcontroller (104) via one of a wire link and a wireless link.

* * * * *